United States Patent [19]

Ryu

[11] Patent Number: 5,398,951
[45] Date of Patent: Mar. 21, 1995

[54] CONVERTIBLE CHILD CAR SEAT/STROLLER APPARATUS

[76] Inventor: Choon W. Ryu, 13100 Gilbert St., #59, Garden Grove, Calif. 92644

[21] Appl. No.: 92,796

[22] Filed: Jul. 19, 1993

[51] Int. Cl.⁶ .............................................. B62B 7/10
[52] U.S. Cl. .................................... 280/30; 280/643; 280/47.38
[58] Field of Search ................. 280/30, 641, 642, 643, 280/647, 648, 650, 47.34, 47.38, 47.4

[56] References Cited

U.S. PATENT DOCUMENTS

| | | |
|---|---|---|
| 4,679,804 | 7/1987 | Johnson . |
| 4,872,693 | 10/1989 | Kennel ................................ 280/30 |
| 4,874,182 | 10/1989 | Clark .................................. 280/30 |
| 4,989,888 | 2/1991 | Qureshi et al. . |
| 5,104,134 | 4/1992 | Cone . |

*Primary Examiner*—Margaret A. Focarino
*Assistant Examiner*—Michael Mar
*Attorney, Agent, or Firm*—R. Lewis Gable

[57] ABSTRACT

A convertible child seat/stroller apparatus is described for use as a child's seat with a vehicle and a stroller. The convertible comprises a seat assembly with a seat area, and a collapsible wheel assembly affixed to the seat assembly and disposable along a path between a retracted position wherein the convertible apparatus serves as the child's car seat and an extended position wherein the convertible apparatus serves as the stroller. The wheel assembly comprises a pair of front legs and a pair of rear legs; each of these legs has a first end pivotally connected to the seat assembly and a second end rotatively connected to a wheel. A manually graspable mechanism is moveable rectilinearly along the path between a first point corresponding to the retracted position and a second point corresponding to the extended position. A collapsible strut assembly is provided for interconnecting the graspable mechanism to each of the legs and is disposable from a collapsed state when the graspable mechanism is at its first point to an extended state when the graspable mechanism is at its second point for stabilizing the wheels in their extended position against lateral forces.

8 Claims, 3 Drawing Sheets

CONVERTIBLE CHILD CAR SEAT/STROLLER APPARATUS

FIELD OF THE INVENTION

This invention relates to infant strollers. In particular, this invention relates to improved infant strollers that are convertible into a child safety seat for a motor vehicle.

BACKGROUND OF THE INVENTION

Several types of strollers are capable of converting into car-seats. When traveling by motor vehicle with a small child, these types of strollers are more practical than carrying both a child car safety seat and a separate stroller because they take up less space and cost less. The problems that face the convertible stroller/carseats now on the market are: the complexity and number of parts, their weight and size, and the difficulty of converting the child car seat to the stroller, or the stroller to the child car seat particularly when the child remains in the carrier.

A stroller that converts into a child car seat is disclosed in U.S. Pat. No. 5,104,134 entitled CHILD'S COMBINATION CAR-SEAT AND STROLLER to Cone. Cone discloses a molded plastic shell, which supports lower door panels and a wheel assembly. The wheel assembly moves along a pair of support members between an upper, retracted position within the shell and a lower extended position beneath the shell. A pair of struts support the front wheels, and a pair of struts support the rear wheels. Both pairs of struts are pivotally connected at one end to a manual release member. The wheel assembly of Cone includes numerous parts, which will add to the weight of his combination. Further, for the child to remain in the seat while converting the combination into the car seat or into the stroller, it must be lifted off the ground while simultaneously pulling or pushing the wheel release member to permit the door panels to open or close.

The following patents are characteristic of the present state of art in this field. U.S. Pat. No. 4,989,889 to Qureshi et al. discloses a body with a seat portion, arm rests on each side of the seat portion and a wheel assembly. The wheel assembly includes a plurality of struts, each strut having a first end pivotally connected to the body and a remote end to which a wheel is rotatably attached. The struts are rotated to a retracted position in which the device is used as a car seat and to an extended position in which the device is use as a stroller. Each arm rest defines a cavity for receiving the wheels and struts when disposed in their retracted position. Means are connected to each strut to lock it in each of its extended and retracted positions. A cover closes the cavities when the wheels are disposed in their retracted position and would require the device to be lifted before the wheels could be extended. Qureshi also discloses the use of openings to attach a car seat-belt on the rear of his device. Another example, U.S. Pat. No. 4,679,804 to Johnson discloses a convertible car-seat/stroller which includes a plurality of legs, each having a first end pivotally connect to the seat and a second end to which wheels are rotatably connected. The legs are rotated from a retracted position underneath the seat to an extended position.

The convertible child car seat/strollers, as described above, have wheel assemblies, which may be converted to a stroller by disposing their wheel assemblies to an extended position. Typically, it is necessary to lift such convertible apparatus, often with a child seated therein, and at the same time to manually lower the wheel assemblies to their extended position. If wheel assemblies having locking mechanisms, it may be necessary to manually actuate such mechanisms to release the wheel assemblies from their retracted positions, again at the same time the user is lifting the apparatus and pulling down the wheel assemblies.

SUMMARY OF THE INVENTION

It is an object of this invention to provide a new and improved convertible child's car seat/stroller, which is of a simpler and lighter construction.

It is a further object of this invention to provide a new and improved convertible child's car seat/stroller, which permits easy conversion between the car seat and the stroller.

It is a still further object of this invention to provide a new and improved convertible child's car seat/stroller, which is easy to grasp and lift, and at the same time, to release a collapsible wheel assembly to permit it to fall under its own weight to its extended position, wherein this apparatus serves as the stroller.

It is a further object of this invention to provide a new and improved convertible child's car seat/stroller with a collapsible wheel assembly with a graspable mechanism, whereby the wheel assembly may be readily lifted to convert the apparatus to serve as the child's car seat.

In accordance with these and other objects of this invention, there is described a convertible child car seat/stroller apparatus for use as a child's car seat with a vehicle and a stroller. This apparatus includes a seat assembly comprising a seat, and a collapsible wheel assembly affixed to the seat assembly and disposable along a path between a retracted position wherein the convertible apparatus serves as the child's car seat and an extended position wherein the convertible apparatus serves as the stroller. A handle is affixed to the seat assembly to permit the convertible apparatus to be manually lifted. A releasable lock mechanism is affixed to the assembly in a sufficiently proximate relation to the handle to permit a user to manually grasp the handle and at the same time to manually actuate the releasable lock mechanism.

In a further aspect of this invention, the wheel assembly comprises a pair of front legs and a pair of back legs; each of the legs has a first end pivotally connected to the seat assembly and a second end rotatively connected to a wheel. A manually graspable mechanism is moveable rectilinearly along the path between a first point corresponding to the retracted position and a second point corresponding to the extended position. A collapsible mechanism is provided for interconnecting the graspable mechanism to each of the legs and is disposable from a collapsed state when the graspable mechanism is at its first point, to an extended state when the graspable mechanism is at its second point for stabilizing the wheels in their extended position against lateral forces.

BRIEF DESCRIPTION OF THE DRAWINGS

A written description setting forth the best mode presently contemplated for carrying out the present invention, and of the manner for implementing and using it, is provided below with respect to the following drawings.

DETAILED DESCRIPTION OF THE PREFERRED EMBODIMENT

Figure 1:
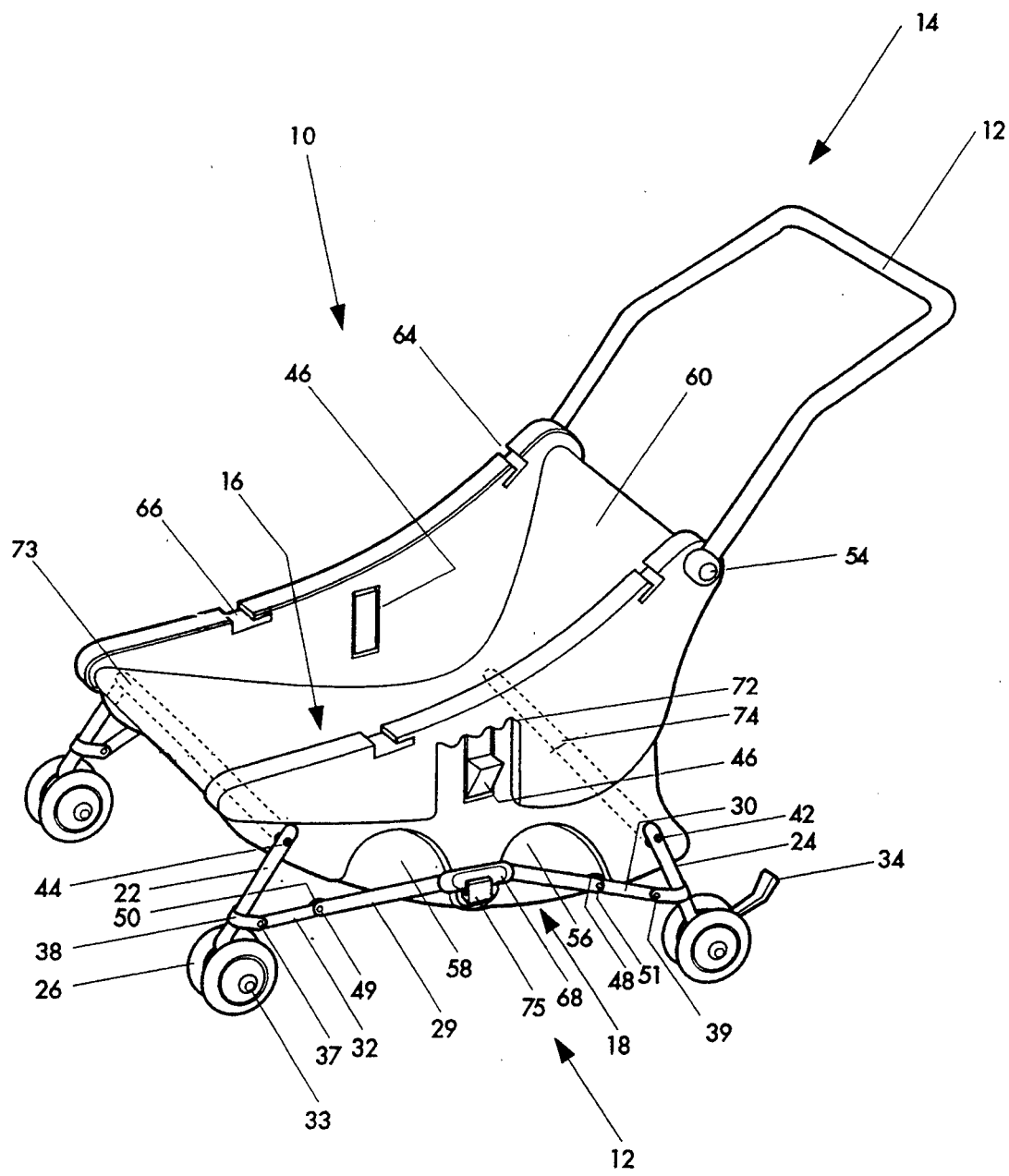
FIG. 1 is a perspective view of a convertible child seat/stroller apparatus in accordance with this invention in which this convertible apparatus is disposed in its stroller mode.
Figure 2:
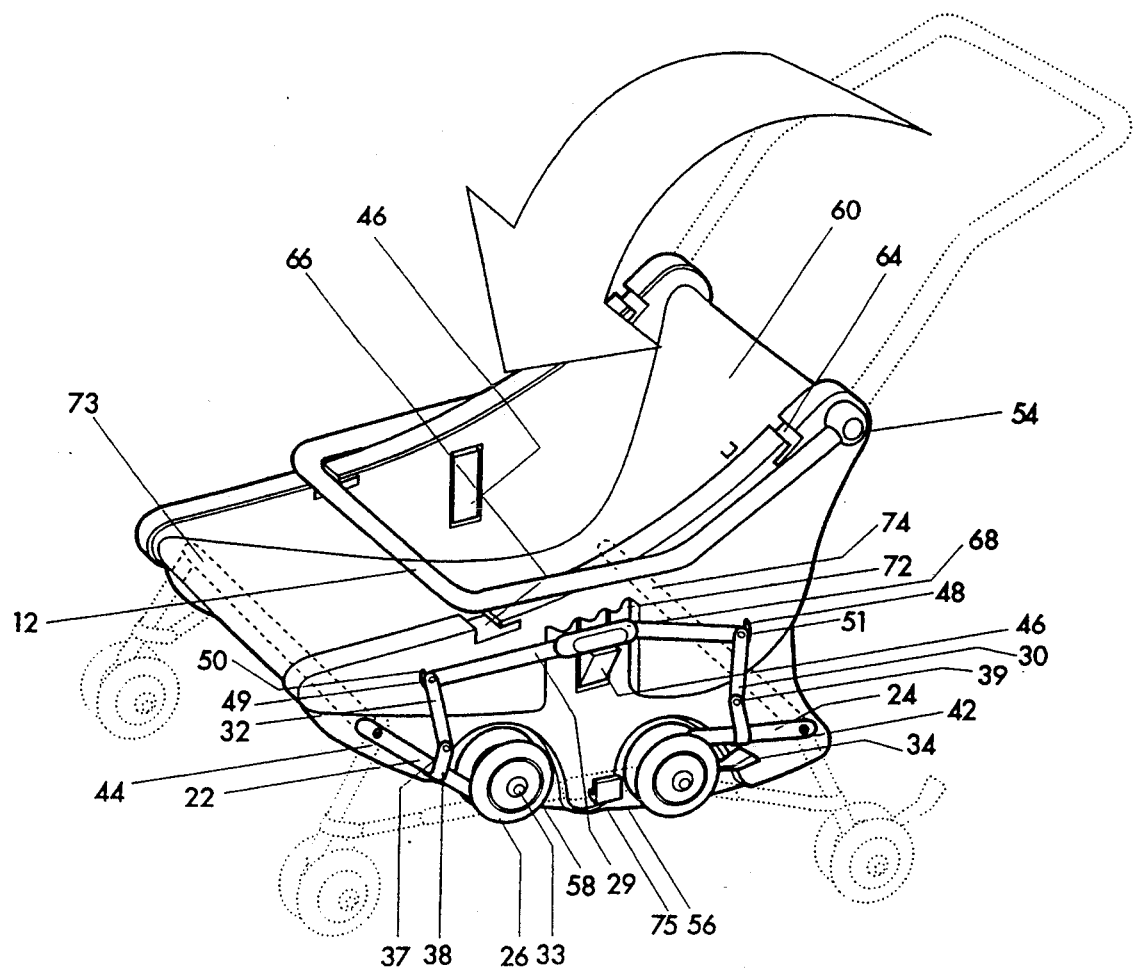
FIG. 2 is a perspective view of this convertible apparatus in its child safety car-seat mode.

Referring now to FIG. 1, the preferred form of a convertible child safety seat and stroller apparatus 10 is shown as comprising a stroller wheel assembly 12, a molded plastic seat 16, a collapsible stroller handle assembly 14, and a locking mechanism 45. The wheel assembly 12 is convertible between an extend position as shown in FIG. 1 wherein the convertible apparatus serves as a stroller and a retracted position as shown in FIG. 2 wherein the convertible apparatus serves as a child safety seat. A releasable locking mechanism 45 holds the wheel assembly 12 in its retracted position and is actuatable to release the assembly 12 to fall under its own weight from its retracted position to its extended position.

The stroller wheel assembly 12 comprises a pair of front wheel legs 22 and a pair of rear wheel legs 24 (only one wheel of each pair being shown in the FIGS.). One end of each of the legs 24 and 22 is attached on both sides of the molded plastic safety seat 16 by a rear pivoting connector 42 and a front pivoting connector 44, respectively. A pair of rear wheels 26 is rotatably connected to the other ends of the legs 24 by a pair of connectors 33, respectively.

The wheel assembly 12 further includes a pair of interconnecting assemblies 18, which extend between and interconnect one of the pair of front wheel legs 22 to a corresponding one of the pair of rear wheel legs 24. Only one assembly 18 is shown in the FIGS., it being understood that the other assembly 18 is disposed on other side of the safety seat 16. Each of the assemblies 18 comprises a front strut 32, a lockable center strut 29 and a rear strut 30, which are pivotally connected to each in an end-to-end relation. A first strut clamp 38 is affixed to each of the front wheel legs 22. In turn, a first end of the front strut 32 is pivotally fastened by a connector 37, e.g., a rivet, to its corresponding front strut clamp 38. The second end of the front strut 32 is attached to a first end of the lockable center strut 18 by a pivoting connector 49. A front strut brace 50 is attached to the top edge of the center strut 29 and prevents the struts 32 and 29 from forming an angle in excess of 180 degrees with respect to each other, i.e., the axes of the struts 32 and 29 form a straight line when the wheel assembly 12 is disposed in its extended position. Further, a first end of the strut 30 is pivotally connected to a strut clamp 40 by a pivoting connector 39. The clamp 40 is in turn affixed to the rear wheel leg 40. A second end of the strut 30 is rotatable connected to the lockable center strut 18 by a pivoting connector 51. A rear strut brace 48 is affixed to the top edge of the center strut 29 to hold the struts in the substantially horizontal position as shown in FIGS. 1 and 2 when the wheel assembly 12 is disposed in its extended position. An L-shaped handle 68 is affixed to the midpoint of each of the center struts 29 to be manually grasped and raised to dispose the wheel assembly 12 from its extended position to its retracted position.

The molded plastic safety seat 16 has a contoured seat area 60 for a small child to sit in. On both sides of the molded plastic safety seat 16 there are upper seat-belt notches 64 and lower seat-belt notches 66 to enable the convertible apparatus 10, in the safety seat mode as seen in FIG. 2, to be secured in the rear seat of a motor vehicle either facing towards the front or rear of the vehicle. On both sides of the molded plastic safety seat 16, there is a strut assembly recess 62 for receiving the wheel assembly 12 in its retracted position as shown in FIG. 2. In its retracted position, the struts 30 and 32 fold down at a 45° angle to the lockable center strut 18, disposing most of elements 18, 30, and 32 within the strut assembly recess 62 when it is in its retracted position. In particular, the recess 62 comprises a pair of front wheel recesses 58 and a pair of rear wheel recesses 56 to respectively receive the front wheels 28 and the rear wheels 26, when the wheel assembly 12 is in its retracted position. A cutout is formed on each side of the seat area 60 within the recesses 60 respectively to provide manually graspable handles 72, whereby the entire convertible apparatus may be easily lifted. Significantly, the handles 72 are disposed adjacent their respective locking mechanisms 45 so that the user may grasp the handles 72 and, at the same time, manually operate the locking mechanisms 45.

A collapsible stroller handle 54 is attached to the molded plastic safety seat 16 on both sides by a pivoting handle connector 54. The stroller handle 54 either folds down over the top of the molded plastic seat 16 into the lower seat belt notch 66 as seen in FIG. 2 or is in an upright position as seen in FIG. 1.

Figure 3:
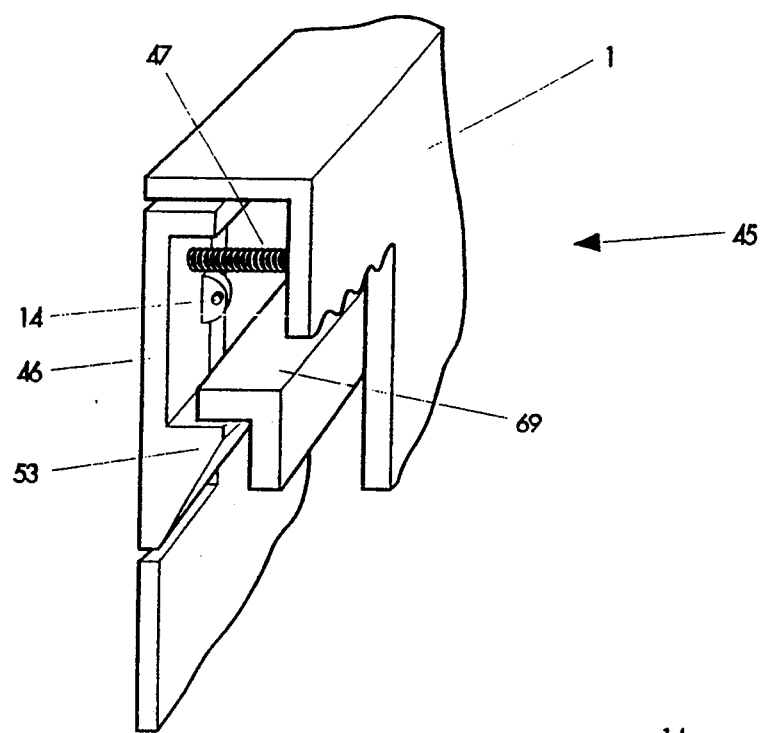
FIG. 3 is a side, sectioned view of the locking mechanism incorporated within the convertible apparatus as taken through line 3—3 of FIG. 2.
Figure 4:
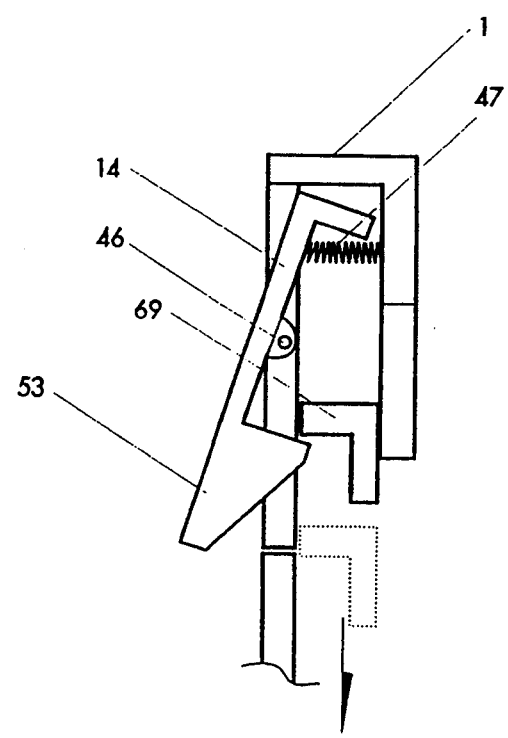
FIG. 4 is a side, elevational view of the locking mechanism shown the latch in its disengaged position.

The stroller wheel assembly 12 is locked into its retracted position as seen in FIG. 2 by the releasable locking mechanisms 45. Each of the mechanisms 45 includes a manually releasable detente 46 and a spring 47 for urging the detente 46 into a locking relation with the wheel assembly 12 and, in particular, its handle 68. As shown in FIG. 3, the handle 68 and the detente 46 respectively include mating latches 69 and 53. FIG. 3 shows the latches 69 and 53 in an engaged relation, whereby the wheel assembly 12 is retained in its retracted position. To release the locking mechanism 45, the spring biased detente 46 is pushed to the left as shown in FIG. 3, whereby the latches 69 and 53 are disengaged from each other and the wheel assembly 12 is permitted to fall under its own weight to its extended position. The handle 68 is attached to a guide member 70, which fits within a channel 20. The channel 20 is formed within the seat assembly 16 and is vertically oriented as shown in FIGS. 1 and 2. An opening 21 is formed in communication with the channel 20 to permit the handle 68 to be connected with the guide member 70. The guide member 70 and the handle 68 connected thereto move rectilinearly within the channel 20 between a first or top point wherein the wheel assembly 12 is disposed in its retracted position and a second or bottom point wherein the wheel assembly 12 is disposed in its extended position. As the handles 68 move rectilinearly within their respective channels 20, the wheel assembly 12 moves along a path between its retracted position and its extended position. The detente 46 engages and holds the guide member 70 (and thus the interconnecting assembly 18 and the wheel assembly 12) when the handles 68 are disposed at their first point as shown in FIG. 2. Thus, when the handles 68 are at their first point, they are also proximate to the handles 72, whereby the user may readily grasp either set of handles without putting the convertible apparatus 10 down. When it is desired to dispose the wheel assembly 12 to its extended position and to convert the convertible apparatus 10 to serve as a stroller, the operator manually actuates the detente 46, whereby the detente 46 and the guide member 70 are separated and the wheel assembly 12 falls under its own weight to its extended position.

The combined child safety seat and stroller 10 converts from the stroller mode as seen in FIG. 1 to the child safety seat mode as seen in FIG. 2, by lifting the center struts 29 by their handles 68, along the vertical channels 20 until it is automatically locked in place by the releasable locking detentes 46. It is understood that this conversion process is accomplished in a single lifting motion. The user does not need to remove his or her hands from the handles 68 to otherwise operate a locking mechanism or to retract a wheel assembly. By such a simple lifting motion, the user is able to fold the stroller wheels 26 and 28 inward into the wheel recesses 56 and 58, and to move struts 18, 30, and 32 into the strut assembly recesses 62. The collapsible stroller handle assembly 14 is placed down over the molded plastic safety seat 16 in the lower seat belt notch 66 to function as a partial restraint device, as seen in FIG. 2.

To convert the child safety seat and stroller 10 from the car seat mode as seen in FIG. 2 to the stroller mode as seen in FIG. 1, the user simply grasps the handles 72, lifting the entire convertible assembly 10 and, at the same time, actuates the detente 46, whereby the locking mechanism 45 releases the wheel assembly from its retracted position, thus permitting the wheel assembly 12 to fall under its own weight to its extended position. The weight of the wheel assembly 12 keeps it in the fully extended position as shown in FIG. 1 without the aid of any locking mechanism. The connection of the guide member 70 to the handle 68 and its center strut 29, connects the wheel assembly 12 to the car seat assembly 16 to prevent lateral forces from otherwise collapsing any of the pivotal legs 22 and 24 of the wheel assembly 12.

In considering this invention, it should be remembered that the present disclosure is illustrative and the scope of the invention should be determined by the appended claims.

I claim:

1. A convertible child car seat/stroller apparatus for use as a child's seat with a vehicle and a stroller, said apparatus comprising:
    a) a seat assembly comprising a seat area;
    b) a handle affixed to said seat assembly to permit said convertible apparatus to be manually lifted;
    c) a collapsible wheel assembly disposable between a retracted position wherein said convertible apparatus serves as said child's car seat and an extended position wherein said convertible apparatus serves as said stroller, said wheel assembly comprising first and second front legs and first and second rear legs, each of said legs having a first end pivotally connected to said seat assembly and a second end rotatively connected to a wheel;
    d) manually graspable means moveable between a first point corresponding to said retracted position and a second point corresponding to said extended position;
    e) collapsible means affixed to said graspable means and interconnected to each of said legs for disposing said wheel assembly in said retracted position when said graspable means is moved to its first point and for disposing said wheel assembly to said extended position when said graspable means is moved to its second point for stabilizing said wheels in their extended position against lateral forces; and
    (e) lock means for releasibly holding said wheel assembly in its retracted position and actuable for releasing said wheel assembly from its retracted position, said lock means including a movable latch member for engaging said graspable means when moved to said first point, said lock means affixed to said seat assembly in a sufficiently proximate relation to said handle to permit a user to manually grasp said handle and at the same time to manually engage said latch member to actuate said releasable lock means for releasing said wheel assembly from its retracted position to its extended position.

2. The convertible apparatus of claim 1, wherein said wheel assembly when released by said lock means from its retracted position falls under its own weight to its extended position.

3. The convertible apparatus of claim 2, wherein collapsible means comprises first and second assemblies interconnecting respectively said first front and rear legs and said second front and rear legs, and means for slidably securing said first and second interconnecting assemblies to said seat assembly as said wheel assembly is being disposed between said extended and retracted positions.

4. The convertible apparatus of claim 3, wherein each of said first and second interconnecting assemblies comprises a front strut having first and second ends, a center strut having first and second ends, and a rear strut having first and second ends, said first and second ends of said center strut being pivotally connected respectively to said second ends of said front and rear struts, and means for pivotally attaching said first ends of said front and rear struts respectively to corresponding ones of said front and rear legs.

5. The convertible apparatus of claim 4, wherein said manually graspable means comprises a pair of second handles affixed respectively to said center struts of said first and second interconnecting assemblies.

6. The convertible apparatus of claim 5, wherein said slidably securing means comprises first and second channels disposed within said car seat assembly on opposite sides of said seat area.

7. The convertible apparatus of claim 6, wherein said securing means further comprises first and second guides which fit for slidable movement within said first and second channels respectively, said pair of second handles respectively connected to said first and second guides.

8. The convertible apparatus of claim 7, wherein said seat assembly comprises first and second front recesses and first and second rear recesses for respectively receiving said first and second front wheels and said first and second rear wheels.

* * * * *